(12) United States Patent
Kaddeche et al.

(10) Patent No.: US 11,222,663 B1
(45) Date of Patent: Jan. 11, 2022

(54) ACTIVE SPACING CONTROL FOR CONTACTLESS TAPE RECORDING

(71) Applicant: L2 DRIVE INC., Yorba Linda, CA (US)

(72) Inventors: Karim Kaddeche, Irvine, CA (US); John Wang, Yorba Linda, CA (US); Peter Goglia, Alamo, CA (US)

(73) Assignee: L2 DRIVE INC., Yorba Linda, CA (US)

( * ) Notice: Subject to any disclaimer, the term of this patent is extended or adjusted under 35 U.S.C. 154(b) by 0 days.

(21) Appl. No.: 17/151,021

(22) Filed: Jan. 15, 2021

Related U.S. Application Data

(60) Provisional application No. 63/049,085, filed on Jul. 7, 2020.

(51) Int. Cl.
*G11B 15/62* (2006.01)
*G11B 5/48* (2006.01)

(52) U.S. Cl.
CPC ............ *G11B 15/62* (2013.01); *G11B 5/4893* (2013.01); *G11B 2220/90* (2013.01)

(58) Field of Classification Search
None
See application file for complete search history.

(56) References Cited

U.S. PATENT DOCUMENTS

| | | | |
|---|---|---|---|
| 3,518,647 A | 6/1970 | Altonji et al. | |
| 10,395,681 B1 * | 8/2019 | Breuer et al. | G11B 5/4893 |
| 2003/0039045 A1 | 2/2003 | Biskeborn | |
| 2007/0053105 A1 | 3/2007 | Argumedo et al. | |
| 2009/0067097 A1 * | 3/2009 | Biskeborn et al. | G11B 5/52 360/291 |
| 2009/0141389 A1 * | 6/2009 | Saliba | G11B 5/584 360/71 |
| 2009/0201604 A1 * | 8/2009 | Harper | G11B 5/584 360/77.12 |
| 2009/0310248 A1 | 12/2009 | Hachisuka | |
| 2014/0016226 A1 | 1/2014 | Bui et al. | |
| 2015/0380032 A1 | 12/2015 | McTeer et al. | |
| 2018/0130495 A1 | 5/2018 | Kaddeche | |

OTHER PUBLICATIONS

PCT Application No. PCT/US2021/039512 International Search Report and Written Opinion dated Sep. 28, 2021.

* cited by examiner

*Primary Examiner* — Craig A. Renner
(74) *Attorney, Agent, or Firm* — Polsinelli LLP

(57) ABSTRACT

The present invention relates to the field of tape drives, tape transport, tape heads and tape head suspension. More particularly, the present invention is related to magnetic tape data storage and tape recorders that include components designed to minimize or eliminate head-to-tape contact to reduce or eliminate wear and contamination of tape drive heads. Methods and apparatus of the present invention may dynamically control the head-to-media spacing by moving locations of magnetic heads relative to a tape. Such apparatus may include components designed to minimize magnetic spacing. This may be accomplished using actuators that move the magnetic heads, that move the tape, or that move both the magnetic heads and the tape. This may include supporting a back surface of the tape. Alternatively, or additionally, the movement of the tape past the magnetic heads may be performed using mechanisms that contact and drive the back surface of the tape.

20 Claims, 8 Drawing Sheets

ACTIVE SPACING CONTROL FOR CONTACTLESS TAPE RECORDING

CROSS-REFERENCE TO RELATED APPLICATION

This application claims the priority benefit of provisional U.S. patent application 63/049,085 filed Jul. 7, 2020, the disclosure of which is incorporated herein by reference.

BACKGROUND OF THE INVENTION

Field of Invention

The present disclosure generally relates recording computer data on tape. More specifically, the present disclosure relates to controlling the spacing between recording heads in a tape drive and magnetic tape.

Description of the Related Art

Magnetic tape has been used for decades to store information. Early on, magnetic tape was developed and used primarily for storing audio information, such as voices of people and music. Later, magnetic tape was adapted to record data for computers. Over the years, tape recording has been continuously improved to store more and more information per unit area of tape. Many different forms of recording heads and recording media have been developed over decades of development. Still today, tape is the most cost-effective way to archive computer data for the future. Companies are also compelled to store data for future by law. Because of this, there will be a continued demand for magnetic tape well into the foreseeable future to store data in an archive.

Tape drive manufacturers are constantly challenged to produce tape drives with larger storage capacity to meet market demands. One way to accomplish this objective is to increase the storage density by making refinements to the magnetic layer of the tape. By increasing the storage density, the tape may have more tracks for a given width and each track may have more bits per unit length. Refinements in devices referred to as recording transducers, heads, or magnetic elements have also contributed to increases in the number of data bits that can be recorded per unit length and in the number of data tracks per unit width of the tape.

An important factor affecting the accuracy of the read/write processes is magnetic spacing. The distance between the magnetic layer on the tape where the information is recorded and the transducer(s) that write data and read data is referred to as magnetic spacing or head-to-media spacing (HMS). Magnetic spacing is a critical parameter because the amplitude of a playback signal decreases exponentially with increasing magnetic spacing. The decrease in amplitude caused by increased magnetic spacing may be referred to as Wallace spacing loss. Increased magnetic spacing increases the width of the read back pulse which leads to reduced data densities. The quality of recording or writing information also varies with spacing and decreased magnetic spacing improves the quality of the write operation. Decreased magnetic spacing requires the head to be closer to a major surface area of the tape during operation.

Magnetic spacing for a tape drive is currently set in the factory and continually changes during long term operation. After a sufficient period of time, a steady-state magnetic spacing develops. Magnetic spacing is generally designed to be in the range between 20-50 nanometers (nm) today, depending upon product requirements and materials. Generally, smaller magnetic spacing is capable of supporting higher data densities for a given read/write accuracy, while greater magnetic spacing is capable of supporting lower data densities for a given read/write accuracy. If a system is designed to run at high data densities, but the magnetic spacing is too large, an unacceptable drop in read/write accuracy will occur. Increased magnetic spacing can also result in an increase in error rates and in a decrease in signal to noise ratio.

Read and write heads today have features referred to as "pole tips," and these pole tips commonly wear down when tape media rubs against them. The wearing of these pole tips is caused by friction or rubbing of tape media against a read or write head pole tip. This is commonly referred to as pole tip recession (PTR). PTR occurs over time and this wearing results in pole tips being worn down and receding away from the tape. This process also causes magnetic heads to wear down over time. As such, PTR increases the magnetic spacing between the magnetic fields in the magnetic layer of the tape and the transducer in the head. Each transducer in a tape drive has a unique magnetic spacing. Furthermore, different transducers wear at different rates. In addition, the location of a transducer may result in different rates of pole tip recession.

Ever since the invention of magnetic recording tape, more than 60 years ago, tape heads operated in full contact with a top portion of a tape that includes a magnetic material. In fact, in most tape transport systems, at least parts of the head exert some pressure on the tape to keep it under a precise tension. Because of this, head wear and pole tip recession are built into the design of even modern tape recording systems.

More sophisticated tape head geometries create a difference in air pressure between the two sides of the tape as it streams over the heads. In certain instances, when a tape is streamed over a surface, an air bearing forms, which prevents the tape from coming into "close" contact or into a "friction" contact with the head. Furthermore, modern magnetic heads also use various sorts of and/or many layers of coatings that increase the spacing between the recording surface of the tape and the pole tip of a magnetic head. As a result, minimal tape-to-head distances cannot reach the nanometer-range.

One way to help minimize the tape-to-head distance (i.e. head-to-media spacing) relates to using sharp edges to create a low pressure near a magnetic head. The phenomena that creates this low pressure zone near the heads is referred to as skiving and the sharp edges used to create this low pressure are referred to as skiving (i.e., sharp) edges to scrape off (skive off) the air. As mentioned above these shaped edges form a low-pressure region directly after the skiving edge when a tape moves past that edge. This low-pressure pulls the tape into intimate contact with the tape head because of a higher air pressure on the opposite (back) side of the tape.

An advantage of this type of skiving solution is that the tape-head spacing is small and stable over a wide range of tape speeds. A disadvantage of this skiving is that friction and wear increase due to the direct contact between head and tape. To prevent excessive friction, the tape can be intentionally made rough (i.e. with sporadic bumps on the tape surface) so that only a fraction of the tape surface is in actual contact with the tape bearing surface of the head. Effectively, these bumps increase the tape-to-head spacing.

Alternatively, to increase the linear recording density, one can seek to reduce the tape-to-head spacing by using a smoother tape. This, however, results in an increased friction and/or an increase in the surface area of a head that rubs against the tape surface. This friction or rubbing can degrade the recording surface of the tape and can degrade magnetic heads, which in turn will degrade read back performance of the tape and the tape drive. In extreme cases, friction can even cause the tape drive motors to stall and cause tape breakage, this may occur when surfaces of magnetic heads stick to the surface of a tape—this sticking phenomenon is commonly referred to as "stiction."

Therefore, a tape transport system and a tape head suspension system that can minimize or eliminate contact between the tape and the heads, while keeping them in operable proximity, is highly desirable because they allow for closer head-to-media spacing without degrading tape media or tape heads.

For all the reasons above, tape drives are conventionally designed to accommodate pole tip recession and the resultant degradation in performance. The need to design for pole tip recession results in designing for lower data storage densities than could be supported if the degradation could be prevented. Conventionally, tape drives must be designed to provide an adequate margin for differences in transducer wear rates and positions. This necessitates designing tape drives that have lower data storage capacity that theoretically possible. One reason for this is because, tape read and write heads are often manufactured with numerous coatings that increase head-to-media spacing. As such tape drives could increase recording densities by reducing spacing between the pole tips of the transducer and the tape. Greater storage capacities could also be achieved if there was a reliable and effective way to eliminate or greatly reduce pole tip wear.

These and other problems are addressed by Applicant's invention as summarized below. Furthermore, to maximize an amount of data that is stored on a tape and to increase reliability, what are needed are ways to reduce the head-to-media spacing of tape drives, while minimizing contact between the two.

SUMMARY OF THE CLAIMED INVENTION

The presently claimed invention relates to an apparatus, methods, and non-transitory computer readable storage mediums that control head-to-media spacing in tape drives in novel ways. In one embodiment, an apparatus includes a set of magnetic elements (e.g. one or more tape drive read or write heads), a sensor that senses head-to-media spacing (HMS) data, a tape guide that contacts a back surface of a tape, and an actuator that moves the set of magnetic elements when the HMS associated with the magnetic elements is controlled to a desired distance. This apparatus also includes a controller that controls the movement of the actuator to adjust the HMS to correspond to the desired distance as the tape moves past the set of magnetic elements.

In another embodiment, a method of the present invention receives sensor data from a sensor by a controller that monitors head-to-media spacing (HMS) associated with a tape and a set of magnetic elements. Here the controller may perform an evaluation of the data received from the sensor, identify the HMS based on that evaluation, identify that the HMS should be adjusted to correspond to a desired distance, and control the movement of the actuator to adjust the HMS to correspond to the desired distance as the tape moves past the set of magnetic elements.

In yet another embodiment, a non-transitory computer readable storage medium may implement a method of the presently claimed invention. Here a processor may execute instructions of a program to control magnetic spacing. This processor when executing these instructions may receive sensor data from a sensor, perform an evaluation of the data received from the sensor, identify the HMS based on that evaluation, identify that the HMS should be adjusted to correspond to a desired distance, and control the movement of the actuator to adjust the HMS to correspond to the desired distance as the tape moves past the set of magnetic elements.

DETAILED DESCRIPTION

Figure 1:
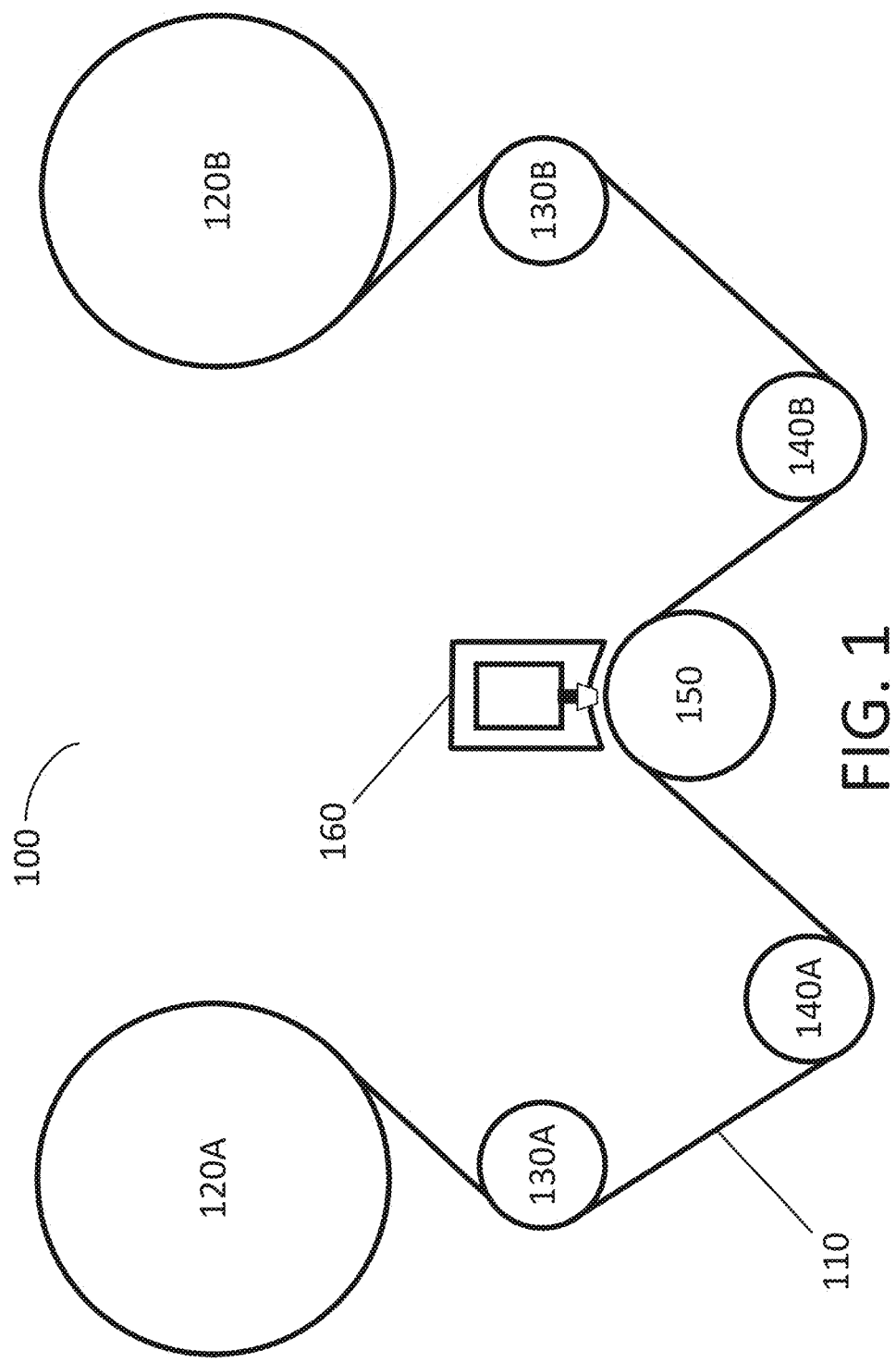
FIG. 1 illustrates a tape drive adapted to include magnetic heads coupled to an actuator to control head-to-media spacing (HMS) to a degree not previously possible.

The present invention relates to the field of tape drives, tape transport, tape heads and tape head suspension. More particularly, the present invention is related to magnetic tape data storage and tape recorders that include components designed to minimize or eliminate head-to-tape contact to reduce or eliminate wear and contamination of tape drive heads. Methods and apparatus of the present invention may dynamically control the head-to-media spacing by moving locations of magnetic heads relative to a tape. Apparatus consistent with the present disclosure include components designed to minimize magnetic spacing. This may be accomplished using actuators that move the magnetic heads, that move the tape, or that move both the magnetic heads and the tape. This may include supporting a back surface of the tape. Alternatively, or additionally, the movement of the tape past the magnetic heads may be performed using mechanisms that contact and drive the back surface of the tape. For example, the back side of the tape could contact a roller that rotates, as this roller rotates it may force movement of the tape in either a forward or a reverse direction as data is read and/or written onto a top portion of the tape. By reducing, or eliminating, contact between heads and tape, tape roughness as well as head coating thicknesses can be reduced allowing for a much lower head to media spacing and higher aerial densities. In certain instances, particular coatings included on surfaces of conventional heads may be eliminated based on head/media contact being reduced or eliminated.

To write and read at the high areal densities used by modern tape systems, the magnetic tape must be in close proximity to the magnetic read/write elements on a tape read/write head. Research efforts are spent on finding a viable solution to reduce the distance between the tape's magnetic recording layer and the read and write elements of the heads. This is commonly referred to as magnetic spacing or head-to media spacing (HMS). Since reducing this spacing allows for an increase in the linear recording density (LD, usually measured in kilobits per inch), reduced HMS increases recording densities. In fact, the LD of tape recording and reading system is very sensitive to the magnetic spacing. In the related field of hard disk drives, it is a well-known fact that the areal density capability (ADC, measured in kilobits per square inch) which is the product of the linear density by the track density (measured in kilo-tracks per square inch) is inversely proportional to the square of the HMS. So, for example halving the HMS can potentially quadruple the ADC. Magnetic elements commonly used in tape recording today include modern forms of magneto-resistive (MR) heads, commonly referred to as tunneling magneto-resistive (TMR) heads. Magnetic heads commonly also include inductive elements capable of generating strong and rapidly changing magnetic fields. MR heads of various forms including TMR heads include transducers with enhanced sensitivity by magnetically biasing a read element in a tape head. Any of the various inductive or magnetoresistive elements included in a tape write or read heads means that any of these heads are inherently "magnetic elements" because they are sensitive to, respond to, receive, or generate electromagnetic fields.

Current tape systems have a magnetic spacing of several tens of nanometers. As the tape drive operates over long periods of time, this magnetic spacing grows even larger due to deposits on the heads and differential wear of the read and write elements with respect to the rest of the tape bearing surface of the heads. Such deposits may be comprised of media that is scraped off the tape itself. These deposits may also include contaminates that enter the tape drive that are then deposited on the heads by landing on either tape or head surfaces that are then burnished into the surface of the head by frictional forces associated with the tape rubbing on the heads.

A large portion of the spacing in conventional tape drives is comprised of coatings on the heads and the tape. These coatings are necessary to protect the read and write elements of the heads from abrasion by the tape. The art, and science, of magnetic tape recording systems is in finding a combination of materials with the right wear resistance properties that will result in a reasonable head operating life. To further protect the read and write elements of the heads, these are usually recessed away from the tape to protect them against protruding defects in the tape. These recessed elements further contribute to increasing the head-to-media spacing (HMS).

Therefore, if a tape drive can eliminate or substantially reduce contact between the tape and the heads, the coatings on the heads, the reader and writer recess, and the tape roughness can all be drastically reduced adding up to an important reduction in contributions to the HMS. This reduction in coatings, minus the necessary air gap, would result in a significant reduction is HMS and a significant increase in LD and ADC. An increase in LD of 50% or more as the result of lower spacing could be readily achieved.

Another way that eliminating head to tape contact can increase the areal recording density, is by allowing for higher track densities. Track density refers to the number of parallel data tracks that can be recorded on a single tape. Higher track density naturally requires narrower tracks and impose strict track following capability on the part of the head suspensions. In fact, as the tape streams by the heads, there is considerable lateral movement of the tape (movement along the width of the tape). This lateral tape movement (LTM) is due to misalignments and vibrations in the tape transport mechanism but is also due to the friction between the heads and the tape. This friction directly results in linear tape compression (compression along the tape length), due to the discontinuity in tape tension at the point of contact between the tape and the skiving edge of the head. This linear tape compression results in compression waves that propagate at the speed of sound along the tape and reflect off the tape rollers. Resonances modes are thus created and result in high frequency linear tape compression that couples with the lower frequency LTM coming from the tape transport. This combination of frequencies makes the job of track following very hard for the head suspensions therefore requiring the tracks to be wider and limiting the track density.

Eliminating the contact between the tape and the heads, would eliminate the primary source of the high frequency linear tape compression (namely the contact with the skiving edge) thus reducing high frequency components of the LTM making the job of track following much easier and in turn allowing for narrower tracks, higher track densities and higher tape storage capacity.

Many other advantages arise from limiting or eliminating head-to-tape contact and friction. Head wear and head contamination is a principal consequence of contact and friction between heads and tape. Head contamination currently requires the regular use of a "cleaning tape" to remove deposits on the heads. Head wear eventually leads to head failures after only a few thousand hours of operation. The tape itself is also affected by friction with the heads resulting in a limited lifetime and occasional catastrophic tape breakage events.

Historically, all these disadvantages of tape (head wear, head cleaning and tape breakages) were considered endemic to the technology and have become a "fact of life" in the practice of tape data storage. The present invention of a contactless tape-recording system aims to change all that.

As mentioned above, apparatus and methods consistent with the present invention may apply forces to the back side of a tape while magnetic heads are carefully positioned above the tape in a way that mitigates or prevents contact. These back surfaces typically do not include a magnetic coating and could include rough surfaces, patterned surfaces, dimpled surfaces, or rollers or mechanical assemblies that move the back surface of the tape. Furthermore, surfaces on the back of the tape and surfaces on a driving mechanism may engage in a manner that prevents slippage, similar to how gear teeth engage hole or recessions in a chain.

Pressure gradients derived by a various means may also be used to maintain relative positions between the back side of a tape and a mechanical driving mechanism. Such pressure gradients may be generated by a unique form of skiving design, by pressurized gasses, or by a vacuum pressure. These pressure gradients could push, pull, or both push and pull a tape into desired position. Blunted edges or patterned surfaces could also aid in maintaining a relative position of a tape to other features of a tape drive or prevent the formation of a skiving action where it is not desirable.

FIG. 1 illustrates a tape drive adapted to include magnetic heads coupled to an actuator to control head-to-media spacing (HMS) to a degree not previously possible. Magnetic heads of tape drive 100 of FIG. 1 may be controlled to mitigate or eliminate physical contact between magnetic heads and magnetic tape 110. FIG. 1 includes magnetic tape 110, tape reels 120A/120B, tape guide rollers (130A, 130B, 140A, & 140B), tape head roller 150, and head carrier assembly 160. Tape reels 120A and 120B allow tape to be rolled in layers around each of the tape reels 120A & 120B, like a conventional tape drive. Each of these reels may be coupled to a respective motor that allows tape 110 to be pulled or pushed onto or off a respective tape reel. As in conventional tape drives, data may be written as tape 110 moves in different directions (right to left or left to right) past magnetic heads of the tape drive. Tape reels 120A/120B may also help maintain a tension in tape 110. Tape reels 120A/120B may maintain tape tension by being motor driver, for example by a direct current (DC) brushless motors. DC brushless motors are commonly used in various forms of data storage devices, for example, tape drive spindles and media stacks of disk drives both use DC brushless motors. One of ordinary skill in the art would understand that DC brushless motors include coils of wire in close proximity to magnets that are coupled to a spindle that rotates. The spindle is forced to rotate based on various different coils of wire being electrically energized in a series of pulses that generate magnetic fields that in turn interact with magnetic fields of the rotor magnets. Here the interaction of magnetic fields (those generated by these pulses of electricity and those native to the rotor permanent magnets) force the spindle to rotate. DC brushless motors use magnetic fields to create motion without requiring any physical contact between the stator wires and the magnets, because of this, DC brushless motors do not tend to generate particles from the motions they create, unlike DC brushed motors that transfer electricity through brushes as those brushes rub on a surface. While stepper motors are another form of motors that potentially could be used in tape drives to move the magnetic tape, DC brushless motors may be preferred because DC brushless motors tend to rotate more smoothly, without the cogging associated with stepper motors.

Tape rollers 130A, 130B, 140A, & 140B help guide tape 110 as it moves, and these tape rollers may also help maintain tension of tape 110. Tape head roller 150 may also act to guide tape 110 and may also help move tape 110 (from the right to the left or left to right direction of FIG. 1) by applying a rotational force to a backside of tape 110 as a tension of the tape is maintained. Surfaces on the backside of tape 110 or on an edge surface of head roller 150 may be patterned or include rough surfaces the help allow tape head roller 150 to move tape 110. Tape head roller 150 may be driven by any motor known in the art. For example, a motor coupled to tape head roller 150 may be a DC brushless motor or a stepper motor. Relative positioning of tape head roller 150, tape rollers 140A & 140B may be used to control a head wrap angle of tape 110 around tape head roller 150. This may help optimize an amount of physical contact between tape 110 and tape head roller 150. Relative positioning of tape rollers 130A/130B, 140A/140B, and tape reels 120A/120B may help optimize or control an amount of tension of tape 110. Any of the tape rollers 130A, 130B, 140A, or 140B may include active or passive tensioning mechanisms, where tape tension is controlled by forces applied to tape 110. Exemplary wrap angles used include, yet are not limited to angles that approach 90 degrees. Generally, tape rollers 130A, 130B, 140A, & 140B may freely rotate or allow tape 110 to move with little to no frictional forces.

While tape head roller 150 may be coupled to a motor that may act as a primary driver that moves tape 110, roller 150 may alternatively not be directly coupled to a motor. When roller 150 is not directly coupled to a motor, motors coupled to tape reels 120A/120B may act to move tape 110 as in conventional tape drives. In such an instance, tape head roller may freely rotate or allow tape 110 to move with little to no frictional forces.

While not illustrated in FIG. 1, tape head roller 150 may be coupled to one or more actuators (active or passive) that allow roller 150 to move toward or away (in an up and down direction of FIG. 1) from magnetic heads of tape drive 100. An actuator that moves tape head roller 150 may provide a relatively larger or gross motion that allows a new tape to be fed into tape drive 100. This relatively larger motion may include a rotational movement or a liner movement that increased a gap between tape head roller 150 and magnetic head(s) above tape 110 of FIG. 1. Actuators or actuating systems that move roller 150 may include one actuator that provides the relatively larger (gross) motion as compared to a second actuator that may allow roller 150 to be moved by a relatively smaller (fine) motion. Exemplary larger motions may be on the order of several millimeters (¹⁄₁₀ inch or so) or a centimeter (½ inch or so), where exemplary smaller motions may be less than a nanometer, several nanometers, to hundreds of nanometers or so.

In certain instances, tape head roller 150 may be coupled to or interlocked with head carrier assembly 160. Such a coupling mechanism may allow tape head roller 150 when in an operational position to be within a given tolerance or threshold distance from a surface of a magnetic head or a relative distance to other elements of head carrier assembly 160. Once the tape head roller 150 is locked into an operational position the HMS may be adjusted within a movement capability of a fine positioning actuator. For example, in an instance when a tape head roller positions a tape within 1000 nanometers of the surface of a magnetic head, actuators coupled to that magnetic head may have a stroke of at least 1000 or 2000 nanometers. The actuator could then be used to control a head-to-media spacing of 1 nanometer or less.

Figure 2:
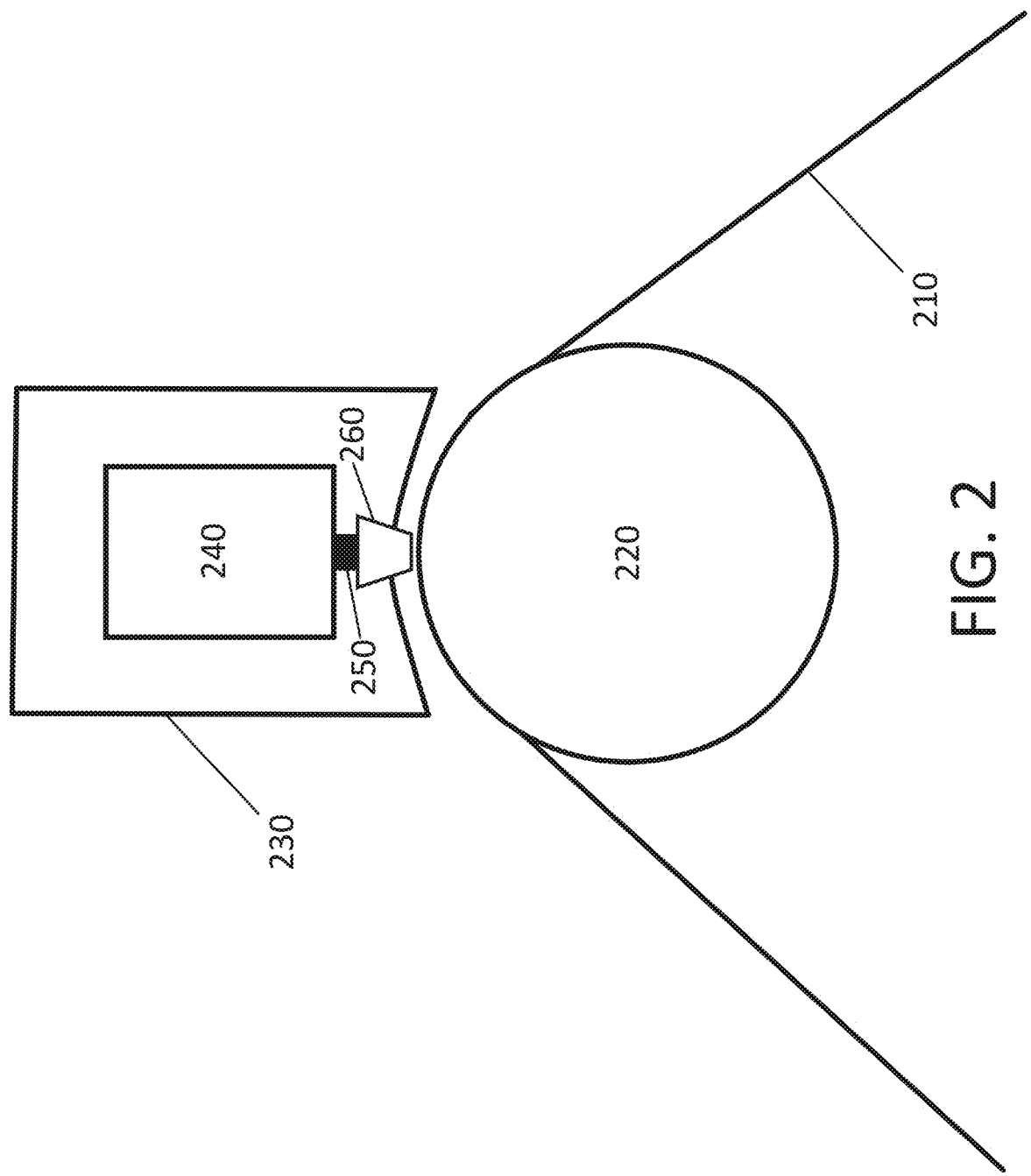
FIG. 2 illustrates a close-up view of several of the elements illustrated in FIG. 1.

FIG. 2 illustrates a close-up view of several of the elements illustrated in FIG. 1. FIG. 2 includes tape 210, tape head roller 220, and head carrier assembly 230. Roller 220 of FIG. 2 may be a same type of roller as tape head roller 150 of FIG. 1. Head carrier assembly 230 of FIG. 2 includes head carrier 240, actuators 250, and head assembly 260. Head carrier 240 itself may include actuators 250 and head assembly 260. Furthermore, head carrier assembly 230 or head carrier 240 may also include an actuation apparatus (passive or active) that grossly adjusts the position of head carrier 240. Actuators 250 may be used to finely control the position of head assembly 260. As discussed in respect to in FIG. 1, exemplary gross (or larger) motions and fine (or smaller) motions. Such large motions may correspond to the order of several millimeters (¹⁄₁₀ inch or so) or a centimeter (½ inch, more or less) and smaller motions may correspond to motions of less than one nanometer to several hundreds of nanometers or more. Exemplary fine positioning actuators include piezoelectric actuators and thermal actuators. In certain instances, piezoelectric actuators may be used to make very fine position adjustments and thermal actuators may be used to make a medium-fine position adjustment or visa-versa. Movement of the actuators may be controlled by applying a voltage to the actuators and movement of these actuators may be controlled at frequencies in the range of 30 Hz to 10 Kilohertz (KHz), for example, to maintain a desired HMS.

As discussed in respect to tape head roller 150 of FIG. 1, tape head roller 220 may be motor driven or may be coupled to actuators or actuation apparatus that provide either of gross (or larger) motions and fine (or smaller) motions of tape head roller 220.

Figure 3:
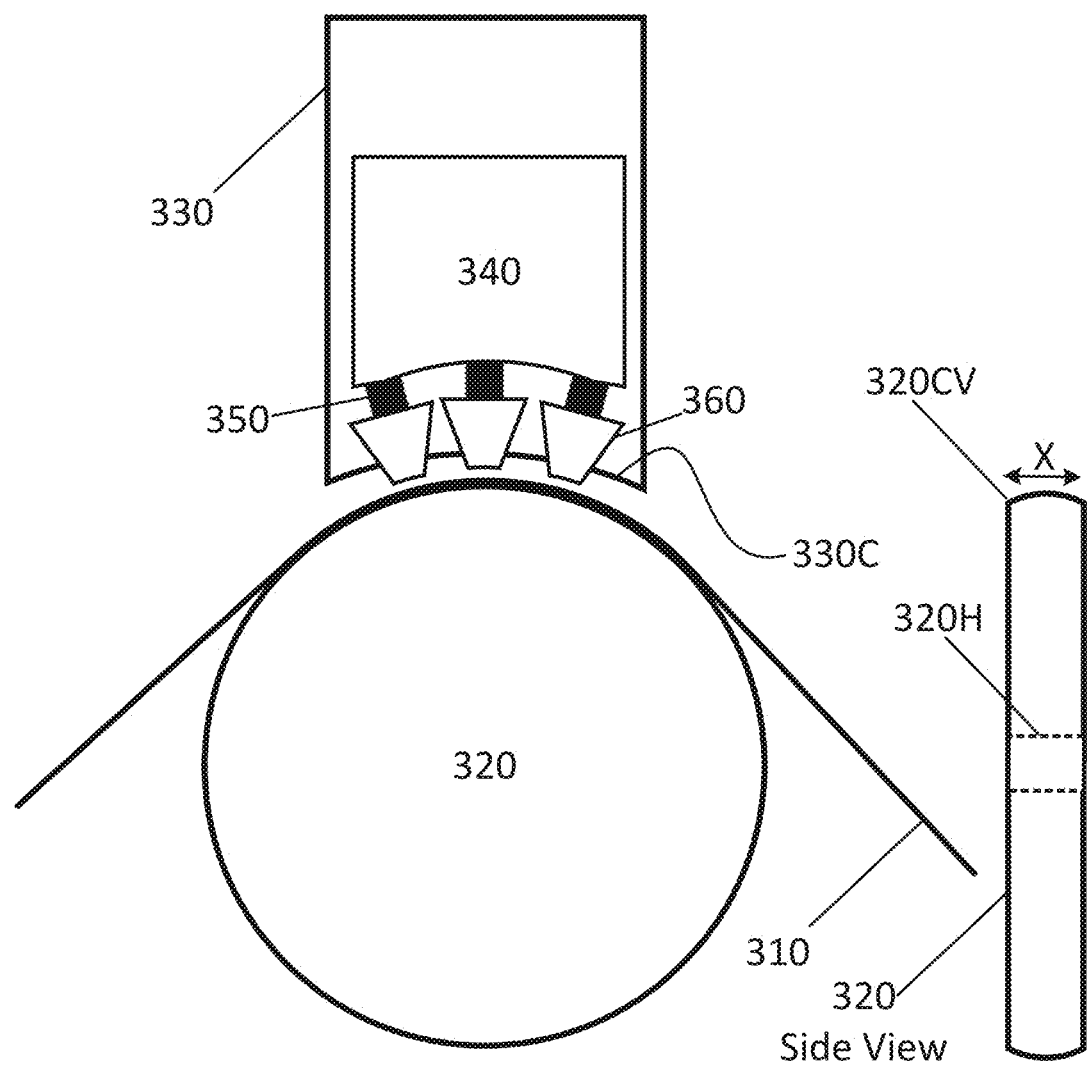
FIG. 3 illustrates several elements that are similar to the elements illustrated in FIG. 2

FIG. 3 illustrates several elements that are similar to the elements illustrated in FIG. 2. FIG. 3 includes tape 310, tape head roller 320, head carrier assembly 330, head carrier 340, head actuators 350, and head assemblies 360. Here, however, three different head assemblies 360 that each include a respective head actuator 350 are illustrated. Note that if a line were drawn between the different head assemblies 360 of FIG. 3 that line would have a concave shape much like the concave shape of line 330C of head carrier assembly 330. This relative positioning of heads assemblies 360 means that each of a set of different assemblies may have a similar HMS relative to tape 310 for a given actuation stroke distance. As such a nominal position for each of the three different head assemblies of FIG. 3 may be approximately a same distance away from tape 310 as that tape moves around tape head roller 320. Here again, exemplary fine positioning actuators include piezoelectric actuators and/or thermal actuators.

An edge surface of tape head roller 320 along which tape 310 moves may have a convex shape. The same may be true of an edge surface of tape head roller 150 of FIG. 1 or tape head roller 220 of FIG. 2. FIG. 3 also includes a cross-sectional side view of tape head roller 320 (320 Side View). This side view includes a mounting hole 320H and a convex outer surface 320CV of tape head roller 320. Each of the head assemblies 360 of FIG. 3 or 260 of FIG. 2 may also be coupled to an actuator that moves these head assemblies in a direction perpendicular to tape 310 or 210 (across the width of the tape) as indicated by the double arrowed line X of FIG. 3. As such, fine actuators included in tape drives consistent with the present disclosure may be able to move head assemblies in a first direction—toward and away from a tape surface—and in a second direction—along a cross-sectional surface of a tape head roller—that is perpendicular to the first direction. Hole 320H may be used to mount tape head roller 320 to a shaft or a set of bearings.

Exemplary radius of tape head roller 320 may be about 10 millimeters to about 13 millimeters. This radius may be selected such to adjust a number of rotations per minute (RPM) that a tape head roller rotates. Lower values of RPM may produce lower frequency disturbances to a tape, yet may correspond to a higher inertia that could make the starting and stopping of tape movement to be slower. While a curvature of the convex portion 320CV of roller 320 in FIG. 3 appears large, this curvature may be very small, for example, this curvature might only span a few microns. Such a slightly convex surface could result in offsetting the effects of concave positioning of head assemblies mounted above or adjacent to roller 320. This could allow both read and write elements of a magnetic head assembly to maintain relative positioning more optimally.

The positioning of magnetic heads in a tape drive and compensating for disturbances in tape drive include making various measurements. Sensors may be used to sends distance between a head/head assembly and a tape. Sensors associated with measuring head-to-media spacing (HMS) include, yet are not limited to capacitive sensors, laser sensors, or laser diode sensors. HMS values may also be inferred from the strength of a readback signal calibrated against the Wallace spacing loss equation.

In instances where HMS is not measured directly, it may be measured indirectly using a combination of sensors. This process may include making more than one measurement and by performing a subtraction. For example, a first sensor could be used to measure thickness of the tape as it moves over a tape guide and a second sensor could be used to measure distances from the head to the tape guide. The HMS could then be calculated by subtracting the tape thickness from the distances between the head and the tape guide. The sensor that measures the distance between the head and the tape guide could also be a capacitive sensor or be another type of sensor. The sensor that measures the thickness of the tape could also be a capacitive sensor that includes more than one plate with a fixed distance between them. A first plate of this capacitive sensor could be placed at the top surface of the tape and a second plate of this capacitive sensor could be placed at the bottom surface of the tape. Any changes in the capacitance of the sensor could be attributed to changes in the thickness of the tape between the capacitor plates.

Once a distance between the tape facing surface and the roller or tape guide (D1) and the tape thickness (TH) are identified, the HMS may be calculated by the formula HMS=D1−TH virtually instantaneously using modern electronic circuits and/or processing elements as the tape moves. HMS could then be adjusted to account for changes in the tape thickness.

While HMS is controlled, reader elements may be used to sense servo data that are commonly written adjacent to, or inline with, data tracks on tape. This servo data could be used to position read and/or write heads precisely over a particular data track. Digital filtering techniques may be used to help filter out resonances associated with a tape drive's mechanical parts or may help filter out the effects of tape flutter or resonances associated with the tape itself.

Figure 4:
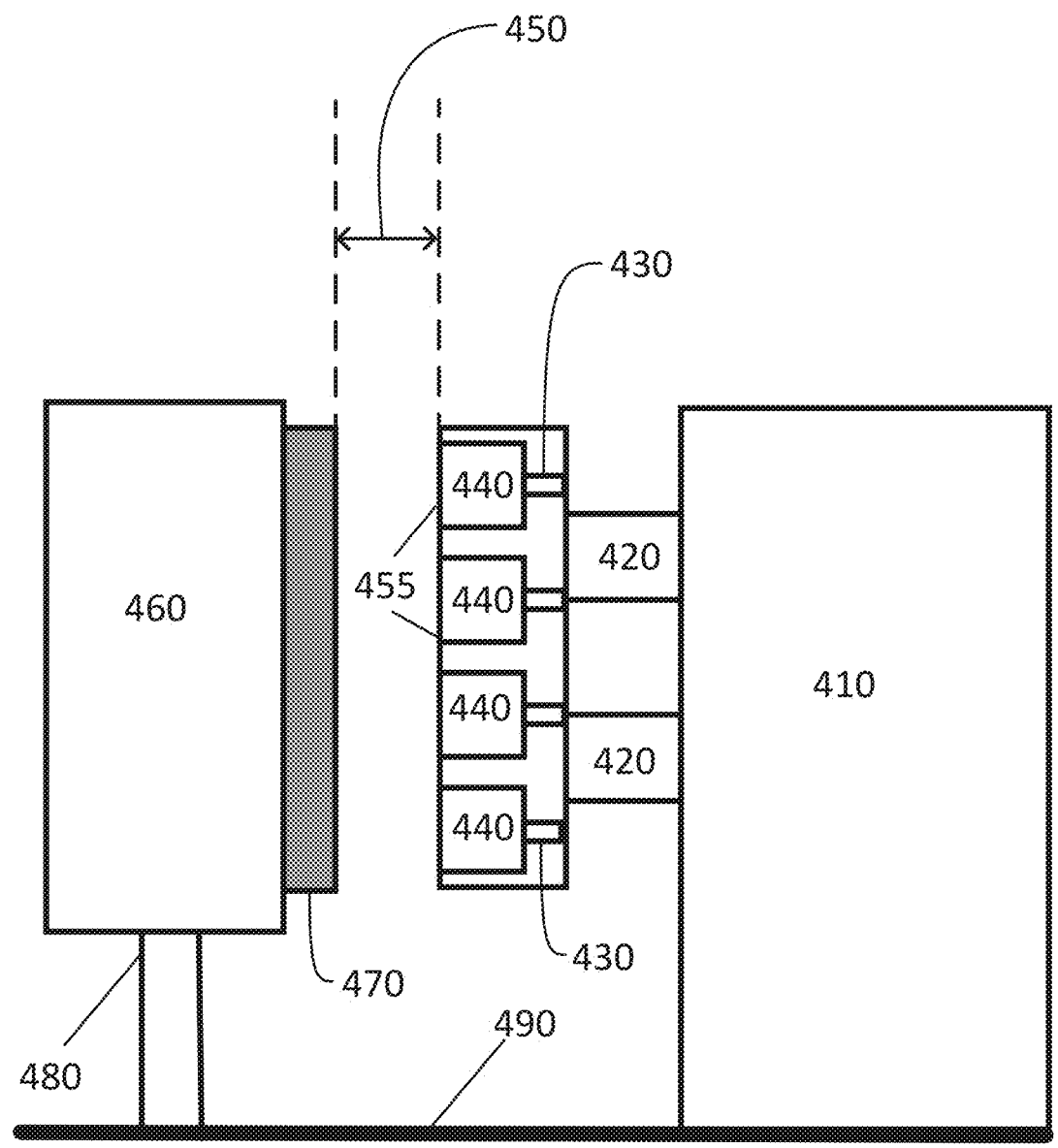
FIG. 4 illustrates a cross-sectional view of parts included at or near the surfaces of a tape as data on that tape is read or written.

FIG. 4 illustrates a cross-sectional view of parts included at or near the surfaces of a tape as data on that tape is read or written. FIG. 4 includes a tape suspension or tape head roller 460 that supports a backside of tape 470. Item 450 is the head-to-media spacing distances between the surface of tape 470 and the "tape-facing-surface" 455 of a head or tape head suspension. The term "tape-facing-surface" refers to surfaces that are more conventionally referred to as "tape-bearing-surface" because conventionally this surface bears frictional forces of tape movement. Since methods and apparatus consistent with the present disclosure avoid allowing the tape to contact such surfaces, the term "tape-facing-surface" is used herein. While this term could be used, it may be used interchangeably with the older term "tape-bearing-surface" as this "tape-facing-surface" may sometimes touch the tape, for example during a calibration process. In other instances, even with precise HMS control a "tape facing surface" may occasionally accidentally or incidentally touch the tape, for example as tape speed or direction is changed.

FIG. 4 also includes head carrier apparatus 410, first stage actuators 420, second stage actuators 430, and heads or sensors 440. In certain instances, first stage actuators 420 may be piezoelectric actuators and second stage actuators 430 maybe either piezoelectric actuators or thermal actuators. Heads or sensors 440 may be magnetic read head elements, magnetic write head elements, or sensors (e.g. capacitive/other) sensors for measuring distance. The first stage actuators 420 may act upon an entire head stripe that includes multiple heads and the second stage actuators 430 may act on a subset of neighboring heads (e.g. one, two, or some other number of heads).

Items 480 and 490 are parts of a structure that may interlock tape suspension/roller 460 to head carrier apparatus 410 of a tape drive. Items included in FIG. 4, like those of other figures of this disclosure are not to intended to be to scale.

Figure 5:
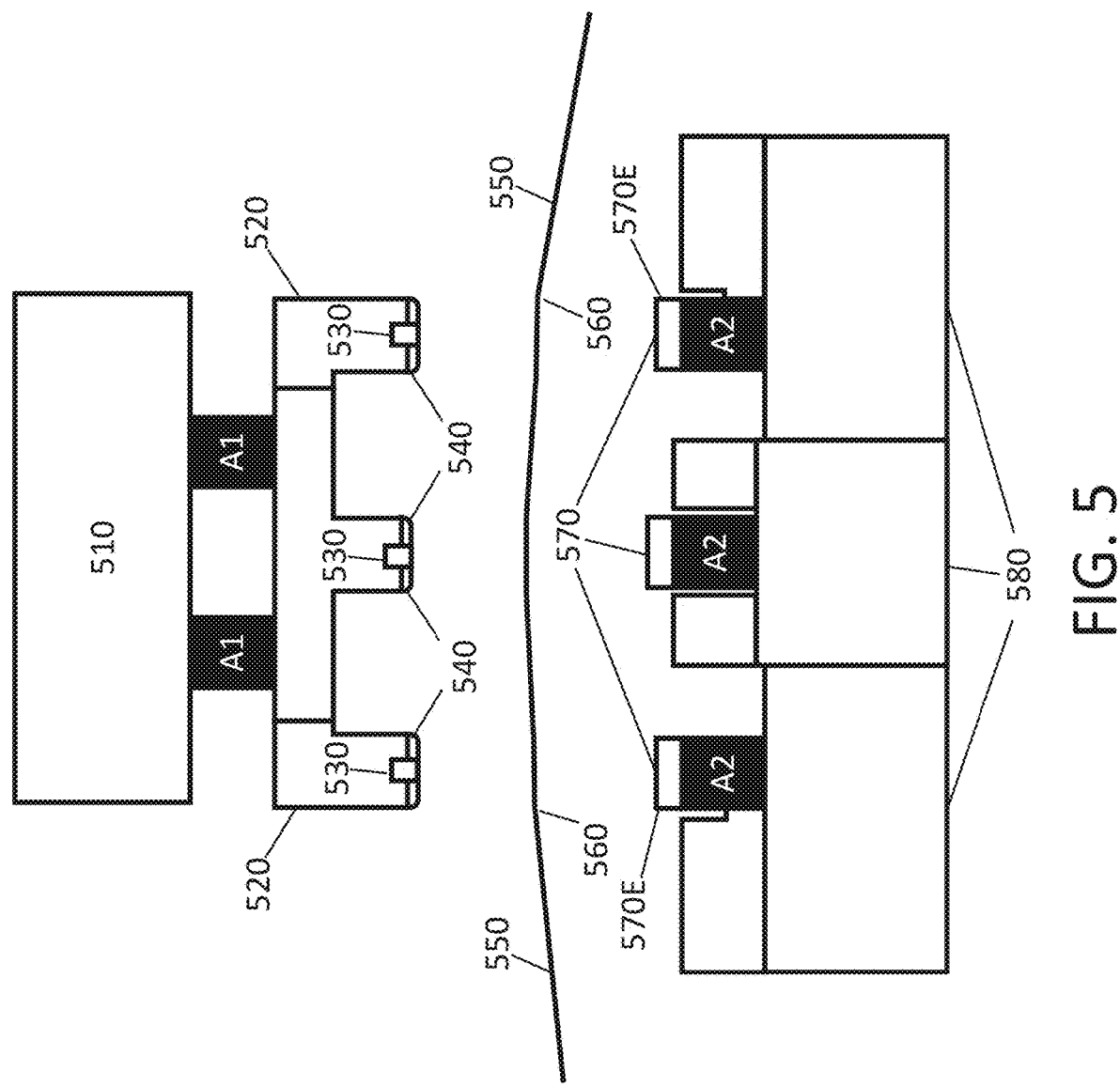
FIG. 5 illustrates an embodiment of the present disclosure that includes features that change relative pressures of air near a tape surface.

FIG. 5 illustrates an embodiment of the present disclosure that includes features that change relative pressures of air near a tape surface. FIG. 5 includes head carrier assembly 510, actuators A1, head assembly 520, read/write or sensing elements 530, and air channels 540 that are located facing the magnetic surface of tape 550. FIG. 5 also includes tape guide 580, actuators A2, and blocks 570 that are located on or near a back surface of tape 550. This back surface of tape 550 is a surface that does not record data and that may not include any magnetic media.

The edged surfaces 570E on the edges of blocks 570 create a low pressure area that tends to pull or suck tape 550 to contact blocks 570. These surfaces 570E may be referred to a skiving edges located on the back side of tape 550 that create a low pressure at areas 560. At points 560, low pressure caused by the back surface of the tape touching or rubbing blocks 570. An angle created by this low pressure at locations 560 may be on the order of 1 to 5 degrees, for example. The low pressure created by skiving edges 570E pull tape 550 away from read/write elements 530. This is unlike conventional tape drives that rely on tapes being drug across or pulled toward the surface of read or write heads.

Air channels 540 may be used to provide pressurized air or air at ambient pressure that is higher than air pressures at locations 560 of FIG. 5. Because of this, the apparatus of FIG. 5 may both pull and push tape 550 in a direction away from elements 530. Actuators A1 and A2 may then be used to control the HMS of elements 530 of FIG. 5. Air channels 540 may be coupled to the external environment via filters not illustrated in FIG. 5. Because of skiving edges 570E and/or because of air channels 540, magnetic media on a front (or recording) surface of tape 550 may never make contact when data is written to or read from tape 550.

Figure 6:
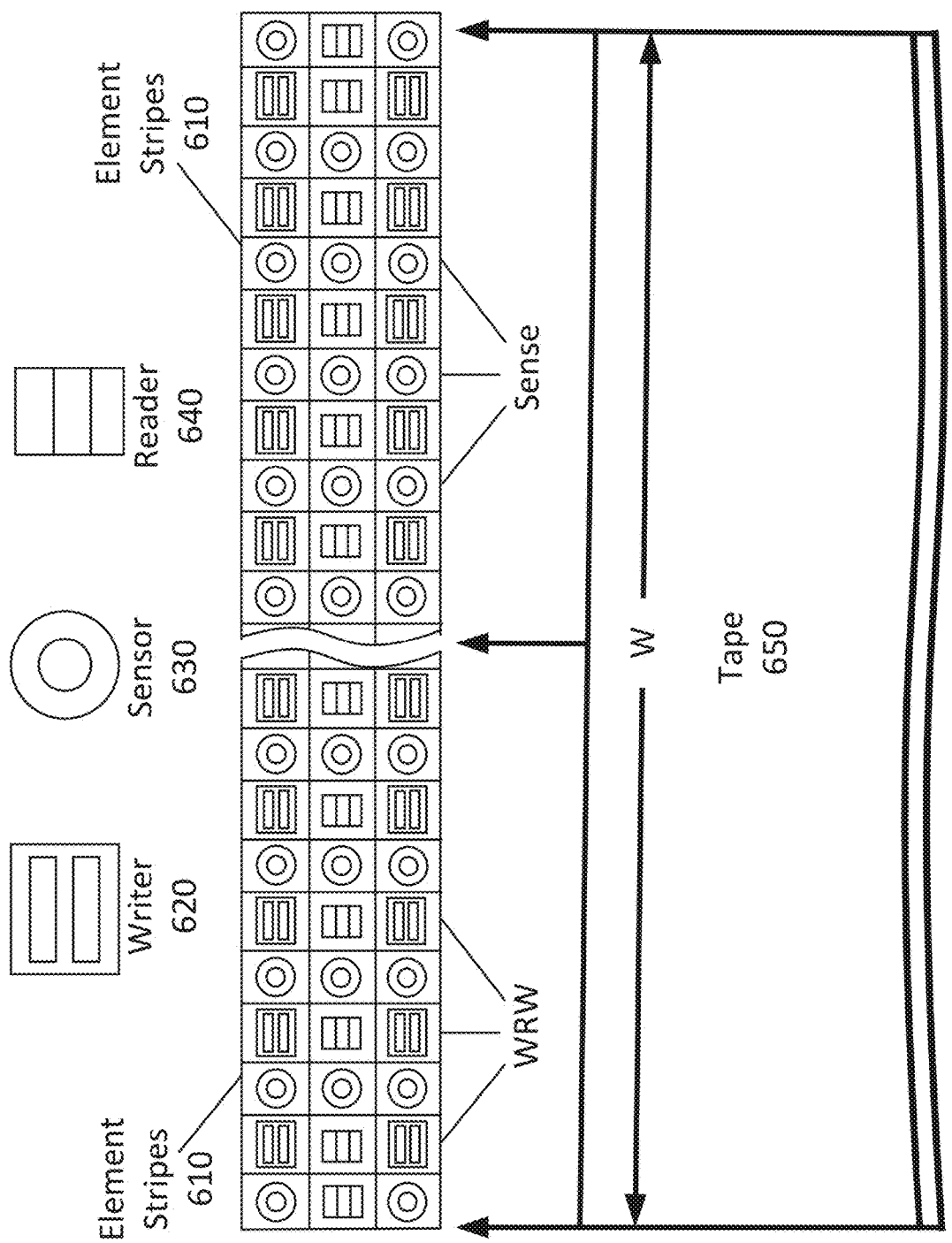
FIG. 6 illustrates a series of elements that can include magnetic reading elements, sensor elements, and writer elements.

FIG. 6 illustrates an assembly of a series of elements that can include magnetic reading elements, sensor elements, and writer elements. The element stripes 610 of FIG. 6 include writing elements 620, sensor elements 630, and reading elements 640. Note that each of these elements are illustrated with different shapes, writing elements 620 include two smaller rectangular boxes inside of a larger rectangular box, sensors 630 include a smaller circle located inside of a larger circle, and reading elements 640 are illustrated as a set of lines within a rectangular box (or as 3 equally sized rectangular boxes stacked on top of each other).

Note that each of the various elements are located at the tape facing surface in relative positions in proximity to tape 650 as that tape moves in a direction indicated by the upward pointing arrowed lines of FIG. 6. Note that FIG. 6 identifies sections of element stripes 610 where two write elements are separated by a read element—as indicated by text WRW. FIG. 6 also identifies sensor elements (Sense) that include sensors adjacent to either a read element, a write element, or both. Note as the tape moves upward, each set of read/write elements may be used to write different tracks of data and read back that data immediately after it is written. These elements may also be able to read track positioning data that may be used to follow servo data that may also be written on the tape. FIG. 6 is not intended to be to true scale.

The element stripes include one middle read head stripe and two different write head stripes, on either side of the read head strip, so that data written as the tape moves in a first direction (e.g. upward as illustrated in FIG. 6) or as the tape moves in a second direction (e.g. downward) can be read verified immediately after it is written. Data from sensors 630 may be used to adjust head media spacing as discussed in respect to FIGS. 1-5. As discussed above actuators in a tape drive may also move across the width of a tape when track following or when seeking from one track to another. As such element stripes 610 may be moved left to right when track following or seeking across portions of the width W of tape 650.

Figure 7:
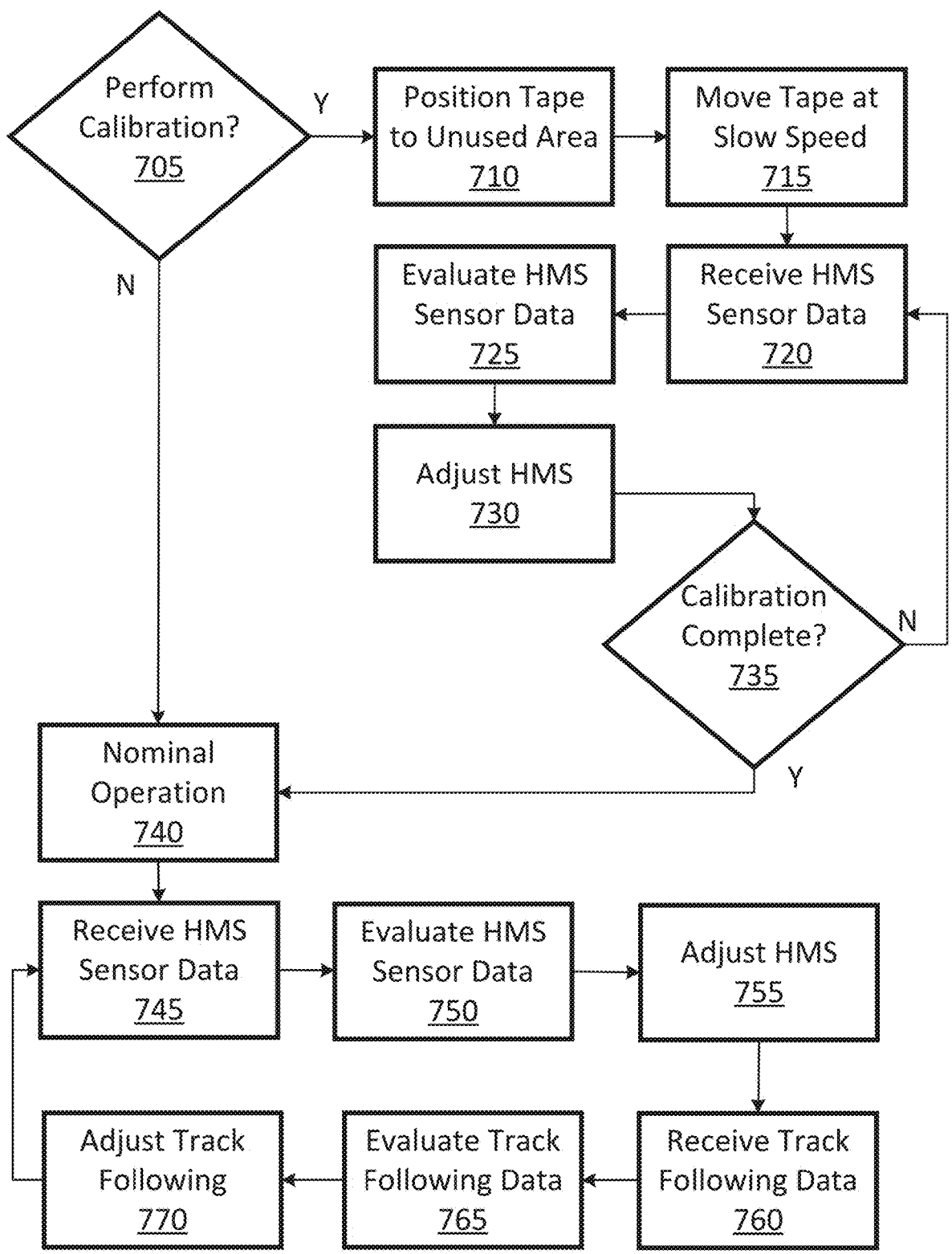
FIG. 7 illustrates a series of steps that may be performed during a head-to media-spacing calibration process and when motions of magnetic heads are controlled when data is read from or written to a tape.

FIG. 7 illustrates a series of steps that may be performed during a head-to media-spacing calibration process and when motions of magnetic heads are controlled when data is read from or written to a tape. FIG. 7 begins with determination step 705 that identifies whether a calibration of head-to-media (HMS) spacing should be performed, when no, program flow moves to step 740 where a normal or nominal mode of operation may be initiated. When determination step 705 identifies that HMS spacing should be calibrated, program flow may move to step 710 where the tape is positioned to an unused area of the tape and then in step 715 the tape is moved at a slow speed. Steps 720, 725, 730, and 735 are steps that may be repeated during the calibration process. These steps include receiving HMS sensor data (720), evaluating HMS sensor data (725), and adjusting HMS (730). Determination step 735 identifies whether the calibration process has been completed. This calibration process may include moving the head carrier assembly of toward the tape until the head-facing-surface of the carrier assembly touches the tape when the tape is moved at a slow speed. Touchdown may be detected based on a change in tape tension, a detected motion of read elements created by friction, a detection of an increase in head temperature due to friction with the tape or the detection of an electrical contact between the head and the tape, or by other physical attributes associated the head-facing-surface touching the tape. Once touchdown is detected, the head carrier assembly may be moved away from tape while sensor data is received.

While not illustrated in FIG. 7, the calibration process may include a rough calibration followed by a fine-tuning calibration. A fine-tuning calibration may include performing a series of read and write operations at slightly different altitudes above the tape. These reads and writes may occur when the tape is moved under nominal conditions. The data collected during this this fine-tuning process may identify an optimal HMS and may be used to identify how much magnetic read/write performance varies given a commanded change in HMS. As such, the calibration may be tuned based on optimal magnetic performance decoupled from an absolute knowledge of actual HMS.

When determination step 735 identifies that the calibration is not complete, program flow may move back to step 720. As mentioned above, steps 720, 725, 730 and 735 may be performed iteratively until the calibration process is complete. When the calibration is complete, program flow may move from determination step 735 to step 740 where normal or nominal operation of the tape drive may be initiated.

As long as the tape drive is operating in a normal mode, program flow may iteratively perform steps 745, 750, 755, 760, 765, and 770. Step 745 may receive HMS sensor data, step 750 may evaluate the received HMS sensor data, and step 755 may adjust HMS. The received HMS sensor data may be evaluated to identify current HMS spacing such that it can be controlled as tape thickness varies or to react to observed changes in fly height. As discussed above HMS may be measured directly or may be calculated from different measurements (e.g. a distance between the head facing surface to a tape roller or tape guide minus a tape thickness measurement).

After step 755, track following (e.g. servo) data may be received in step 760, this track following data may be evaluated in step 765, and adjustments to a track following actuator may be adjusted in step 770. After step 745, program flow may move back to step 745. While not illustrated in FIG. 7, program flow may end such that a tape may be removed from a tape drive.

The steps of FIG. 7 may be performed by any type of processor or multi-processor known in the art. Such a processor may be dedicated to the task of moving a head carrier as discussed above. Alternatively, steps of FIG. 7 may be executed by a processor that also performs other functions associated with the operation of a tape drive. In certain instances, program code of FIG. 7 may be implemented in a low level machine code or firmware. Certain steps or actions may be performed by any combination of electronic circuitry or computer logic. Some functions may be performed using a field programmable gate array, an application specific integrated circuit, a processor or combination thereof. While FIG. 7 illustrates a specific sequence of events, embodiments of the present invention may be performed by changing the order of these steps or by eliminating certain steps or decoupling certain sequences of steps.

Figure 8:
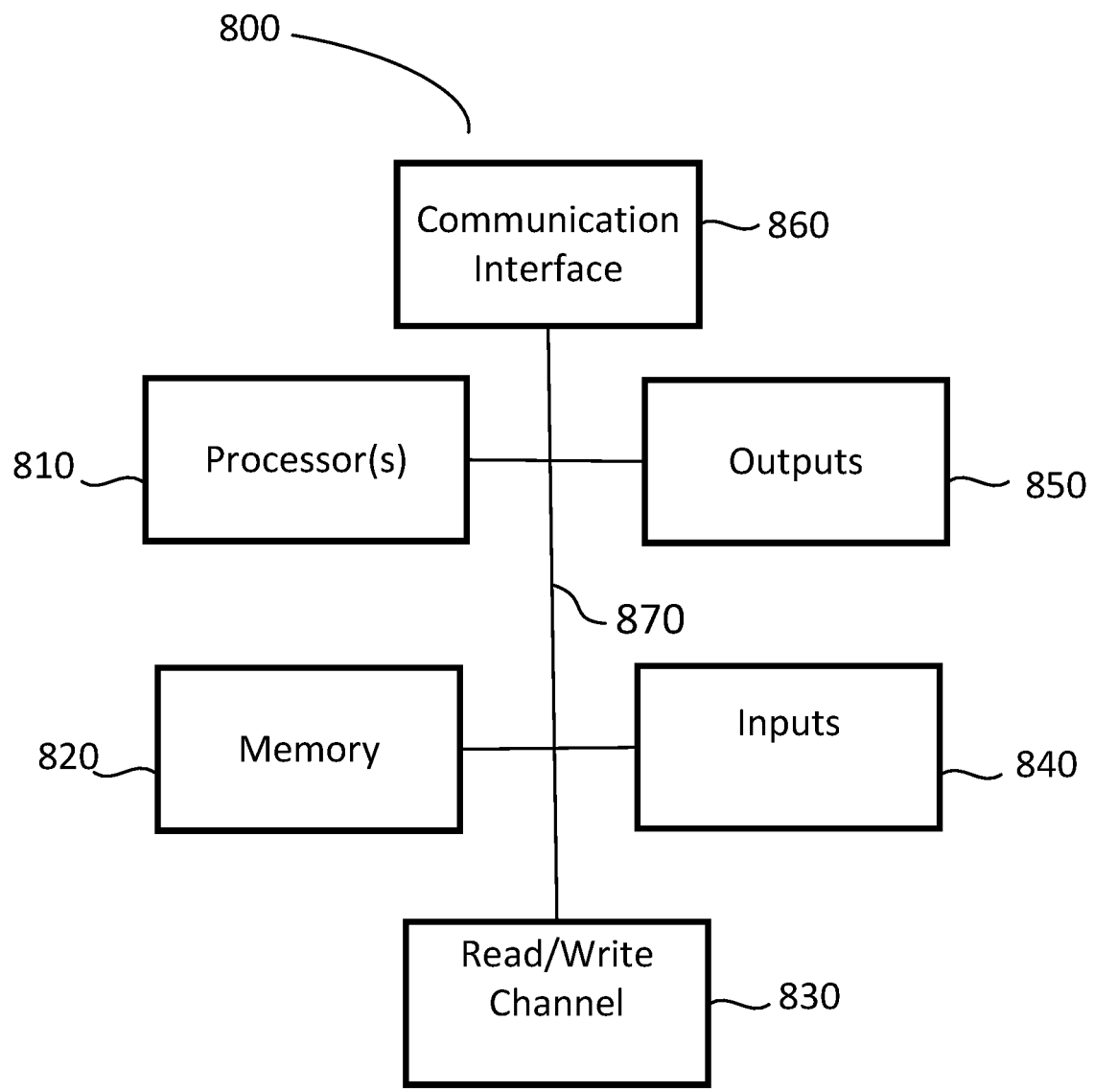
FIG. 8 illustrates electronic components that may be used to communicate with or control the operations of a tape drive.

FIG. 8 illustrates electronic components that may be used to communicate with or control the operations of a tape drive. The Apparatus 800 of FIG. 8 includes one or more processors 810, memory 820, read/write channel 830, inputs 840, outputs 850, and communication interface 860. Various of the different components illustrated in FIG. 8 may be communicatively coupled to each other via bus 870. In operation, processor(s) 810 may execute instructions out of memory 820 to perform operations of controlling operation of a tape, controlling read and write operations, and controlling the motion of actuators as discussed herein. Processor(s) 810 may be any processor known in the art, yet typically may be a microcontroller executing instructions out of memory 820. Memory 820 may be any memory known in the art, typically memory 820 will be or include a form of random-access memory (RAM). Memory 820 may also include a non-volatile memory (e.g. FLASH memory) that stores firmware program code. In operation instructions stored in FLASH memory may be moved to RAM as part of an initialization process.

Read/write channel 830 may include a combination of analog and digital electronics such as a preamplifier, analog filter electronics, digitizing circuitry, and a phase-locked-loop/data separator, for example. Data read from and written to a tape will pass through circuits of read/write channel 830. Inputs 840 may be coupled to sensors that sense head-to-media spacing, tape tension, tape speed, or other parametric data. Inputs 840 may also include or be coupled to an analog to digital converter that converts analog sensor data to digital data. In certain instances, inputs 840 may receive digital data directly from a sensor.

Outputs 850 may include motor driver circuits or actuator driver circuits. Outputs 850 may control the tape speed or may be used to drive actuators that affect head-to-media spacing as discussed herein. As such, outputs 850 may be coupled to DC brushless motors or to actuators (e.g. piezoelectric or thermal actuators). Communication interface 860 may be any form of communication interface known in the art. For example, communication interface may be compatible with the small computer system interface (SCSI) or the serial small computer system interface (SAS). Alternatively, communication interface 860 may be a network interface such as an Ethernet interface. The apparatus of FIG. 8 may receive commands and data from other computers and may provide data to computers via communication interface 820.

Processor(s) 810 may control operation of a tape drive based on commands received from other computers. Processor(s) 810 may receive sensor data from inputs 840, control data that is transferred through read/write channel 830, and may control the operation of motors or actuators by sending signals via outputs 850. Processor(s) may also cache data in memory 820 until that data can be written to tape or provided to other computers.

While various flow diagrams provided and described above may show a particular order of operations performed by certain embodiments of the invention, it should be understood that such order is exemplary (e.g., alternative embodiments can perform the operations in a different order, combine certain operations, overlap certain operations, or decouple other operations, etc.).

What is claimed is:

1. An apparatus for controlling magnetic spacing, the apparatus comprising:
   a set of magnetic elements that include a tape-facing-surface;
   one or more sensors that sense data associated with a head-to-media spacing (HMS) between the set of magnetic elements and a front surface of a tape that stores data magnetically;
   a tape guide that contacts a back surface of the tape;
   an actuator that moves the set of magnetic elements to control the HMS between the set of magnetic elements and the front surface of the tape, wherein the HMS is controlled to correspond to a desired distance separating the front surface of the tape and the tape-facing-surface of the set of magnetic elements by movement of the actuator; and
   a controller that controls the movement of the actuator to adjust the HMS to correspond to the desired distance based on the controller receiving the sensor data from the one or more sensors as the tape moves past the set of magnetic elements when the data is transferred between the set of magnetic elements and the front surface of the tape.

2. The apparatus of claim 1, wherein the shape of the tape guide is round.

3. The apparatus of claim 2, further comprising a motor that rotates the tape guide.

4. The apparatus of claim 1, further comprising a block associated with the tape guide, the block including an edge that generates a lower pressure when the tape is moved by the edge of the block.

5. The apparatus of claim 4, wherein the back surface of the tape contacts the block when the tape is moved.

6. The apparatus of claim 4, further comprising at least one of a rough surface or a patterned surface located on at least one of the tape guide or the back surface of the tape.

7. The apparatus of claim 1, further comprising a second actuator.

8. The apparatus of claim 7, wherein the second actuator moves at least one of the tape guide or the set of magnetic elements.

9. A method for controlling magnetic spacing, the method comprising:
   receiving sensor data from one or more sensors by a controller that monitors a head-to-media spacing (HMS) associated with a tape and a set of magnetic elements;
   performing an evaluation on the sensor data received from the one or more sensors;
   identifying by the controller the HMS based on the evaluation of the sensor data;

identifying that the HMS should be adjusted to correspond to a desired distance separating a front surface of the tape and a tape-facing-surface of the set of magnetic elements; and controlling movement of an actuator to adjust the HMS to correspond to the desired distance based on the receipt of the sensor data from the one or more sensors as the tape moves past the set of magnetic elements when data is transferred between the set of magnetic elements and the front surface of the tape.

10. The method of claim 9, further comprising moving the tape based on rotation of a rolling element.

11. The method of claim 9, further comprising moving the tape past a block that includes an edge, wherein a low pressure is generated at a back surface of the tape based on the tape moving past the edge of the block.

12. The method of claim 9, further comprising controlling the movement of a second actuator.

13. The method of claim 9, further comprising writing data at a front side of the tape when the HMS is controlled to correspond to the desired distance.

14. The method of claim 9, further comprising reading data from a front side of the tape when the HMS is controlled to correspond to the desired distance.

15. A non-transitory computer-readable storage medium having embodied thereon a program executable by a processor for implementing a method for controlling magnetic spacing, the method comprising:

receiving sensor data from one or more sensors by the processor that monitors a head-to-media spacing (HMS) associated with a tape and a set of magnetic elements;

performing an evaluation on the sensor data received from the one or more sensors;

identifying by the processor the HMS based on the evaluation of the sensor data;

identifying that the HMS should be adjusted to correspond to a desired distance separating a front surface of the tape and a tape-facing-surface of the set of magnetic elements; and controlling movement of an actuator to adjust the HMS to correspond to the desired distance based on the receipt of the sensor data from the one or more sensors as the tape moves past the set of magnetic elements when data is transferred between the set of magnetic elements and the front surface of the tape.

16. The non-transitory computer-readable storage medium of claim 15, the program further executable to control movement of a second actuator, wherein contact between a back surface of the tape and a tape guide is maintained based at least in part on the movement of the second actuator.

17. The non-transitory computer-readable storage medium of claim 15, the program further executable to control movement of a second actuator, wherein contact between a back surface of the tape and a block is maintained based at least in part on the movement of the second actuator and a low pressure area generated by movement of the tape past a skiving edge of the block.

18. The non-transitory computer-readable storage medium of claim 15, the program further executable to control the movement of a second actuator.

19. The non-transitory computer-readable storage medium of claim 18, wherein the second actuator moves at least one of a tape guide or the set of magnetic elements.

20. The non-transitory computer-readable storage medium of claim 15, the program further executable to initiate at least one of writing data or reading data at a front side of the tape when the HMS is controlled to correspond to the desired distance.

\* \* \* \* \*